INVENTOR.
FRIEDRICH REHDER

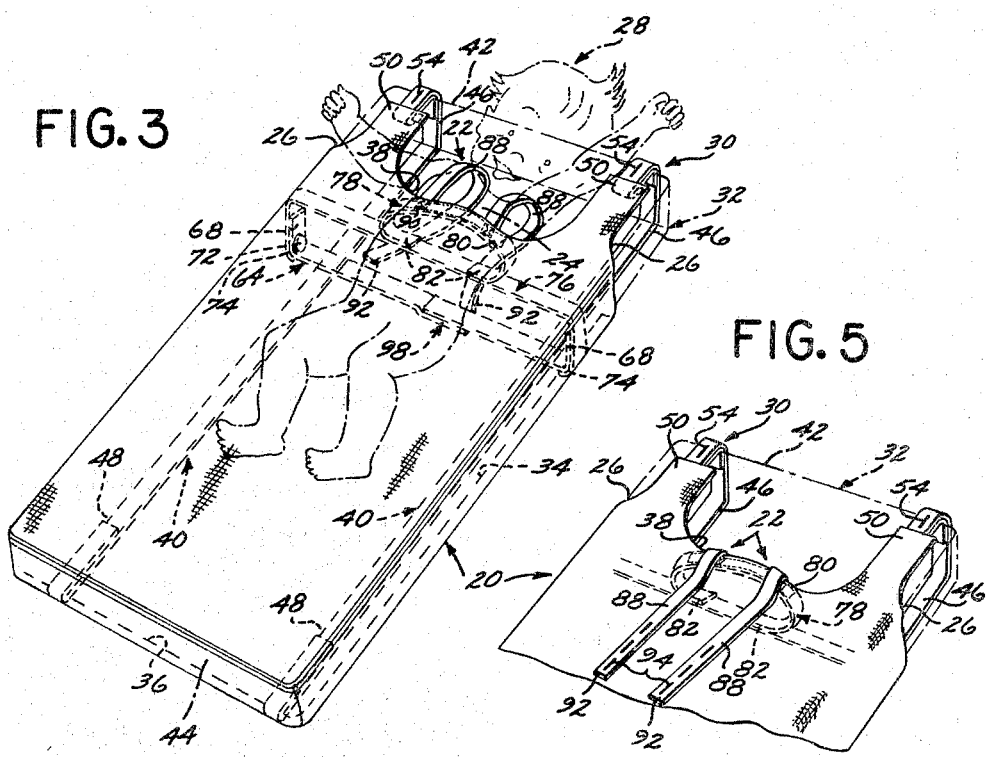
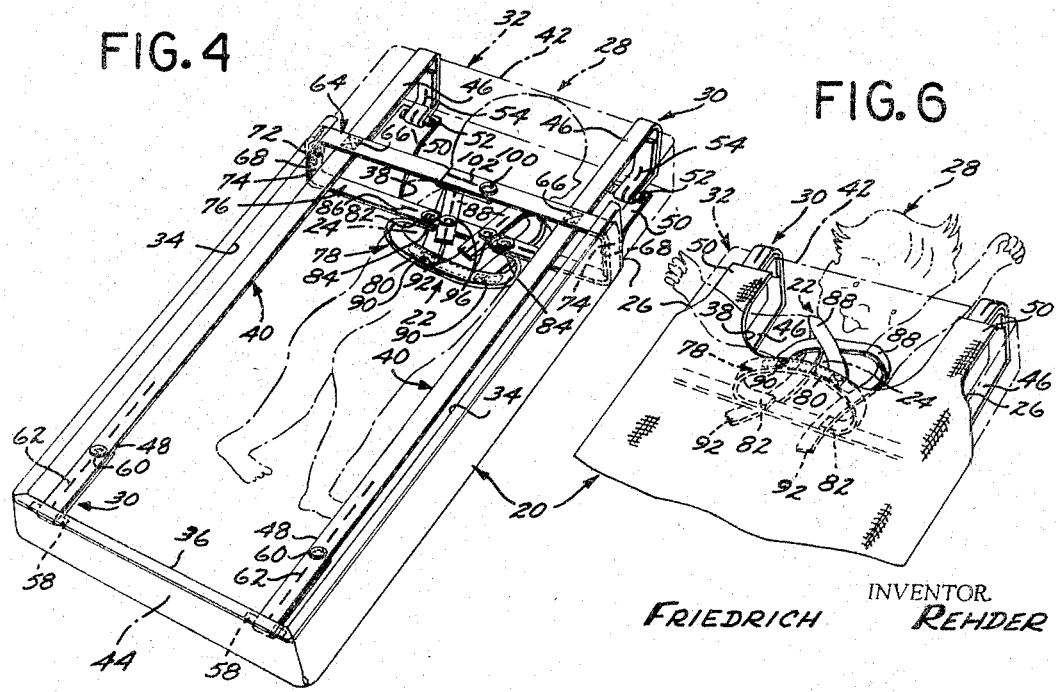

3,323,150
HOLD-DOWN SAFETY COVER FOR A BABY
Friedrich Rehder, 753 N. Hudson Ave.,
Los Angeles, Calif. 90028
Filed June 28, 1965, Ser. No. 467,657
4 Claims. (Cl. 5—336)

ABSTRACT OF THE DISCLOSURE

The specification discloses a hold-down safety cover for a baby lying on a bed or crib mattress and taking the form of a thin sheet blanket provided with controllably engageable and disengageable and size-adjustable attachment means for connecting and attaching a baby's torso to a head edge portion of the blanket and with the blanket being provided with controllably engageable and disengageable and size-adjustable attachment means for connecting and attaching the blanket with respect to the bed or crib mattress.

---

Generally speaking, the present invention relates to a hold-down safety cover for a baby adapted to positively hold a baby in a position overlying a mattress, such as a baby bed mattress, crib mattress, or the like, and underneath the safety cover, and which does so in a completely safe manner incapable of harming the baby in any way and which also retains the safety cover over the baby's body, exclusive of the head and neck of the baby, so that the baby will be prevented from inadvertently throwing off the cover and possibly becoming chilled and catching a cold or other respiratory ailment as a result thereof as frequently occurs when a baby is conventionally covered in a baby bed or baby crib.

Additionally, it should be noted that the hold-down safety cover of the present invention is particularly advantageous as compared to prior art specialized fastening blankets and arrangements intended for generally similar purposes because it is adaptable for use with babies of widely varying ages and sizes, all the way from newborn babies up to an infant or young child of several years of age and, furthermore, is adaptable for attachment with respect to virtually any type and size of mattress upon which a baby may sleep irrespective of whether it is a small baby crib mattress or a much larger baby bed mattress.

In other words, the hold-down safety cover of the present invention is extremely adaptable and capable of being used under widely varying circumstances of use, both as to the size of the baby to be held down and covered by the hold-down safety cover of the present invention and as to the size of the mattress to which it is to be positively but controllably removably attached.

Furthermore, it should be noted that the novel hold-down safety cover of the present invention is very easily and quickly partially opened for insertion of the baby thereunder and/or for removal of the baby therefrom and is just as easily refastened for positive holding of the baby in covered and held-down relationship with respect to the safety cover of the present invention. In other words, the steps involved in using the device of the present invention are extremely simple and easy to perform.

Also, it should be noted that the attachment and detachment of the complete device with respect to a baby crib mattress, a baby bed mattress, or the like, is extremely easy to accomplish and requires little effort on the part of a user thereof, and makes it possible to remove the device very simply and easily for laundering or whenever desired for any purpose whatsoever.

Generally speaking, the hold-down safety cover of the present invention may be said to comprise a blanket provided with controllably engageable and disengageable and size-adjustable baby-to-blanket attachment means for controllably size-adjustably connecting and attaching a baby's body or torso with respect to what might be called a head edge portion of said blanket in a manner incapable of disengagement therefrom by the baby, and with said blanket being further provided with controllably engageable and disengageable size-adjustable blanket-to-mattress attachment means for controllably size-adjustably connecting and attaching portions of said blanket (usually spaced peripheral portions of said blanket, such as what might be called foot edge portions, head edge portions, and, in certain cases, side edge portions) with respect to a mattress in a manner incapable of disengagement therefrom by the baby.

From the above very general description of the broad nature of the present invention, it will be understood that it has numerous advantages over prior art blanket and cover arrangements and/or fastening arrangements intended for generally similar purposes, since most such prior art devices are limited as to the size of the baby which can be fastened thereby, and/or are limited to specific types or sizes of baby crib or baby bed and do not have the above-mentioned virtually universal adaptability feature of the present invention as to the size of the baby which can be fastened thereby and as to the size of the mattress to which the hold-down safety cover can be attached. These prior art disadvantages are completely eliminated and overcome in and through the use of the present invention, which will be usable virtually from the birth of the baby until he is perhaps three years old or so, and which can be used with any type of baby crib or baby bed or the like upon which the young child may sleep.

Furthermore, as pointed out above, the novel device of the present invention is such that the baby is positively held down in a completely safe manner and protected against accidental uncovering.

Additionally, the device of the present invention is such as to prevent any likelihood of injury to the baby, as has occurred in the past with various fastening or hold-down devices and, in particular, as has occurred with makeshift hold-down arrangements such as employed by some mothers who may fasten down (by safety pins) a blanket or sheet member on each side of a baby's neck in an attempt to prevent him from throwing off his covers or getting out from underneath them. In some instances, this has resulted in a baby strangling himself or smothering himself during the night, and it should be clearly noted that the novel hold-down safety cover of the present invention is of a nature such as to make this virtually impossible.

With the above points in mind, it is an object of the present invention to provide a novel hold-down safety cover for a baby (which, throughout this application, shall be broadly construed as meaning anything from a newborn infant to a young child) of the nature referred to both hereinbefore and hereinafter, having the advantages referred to herein, and including the features referred to herein, generically and/or specifically, and individually or in combination, and which is of extremely simple, inexpensive, easy-to-use, and easy-to-remove and launder construction adapted for ready mass manufacture at very low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying two sheets of drawings and is described in detail hereinafter.

FIG. 1 is an upper perspective view, from a vantage point above and longitudinally and laterally offset from the vertical center line of the device, of one exemplary form of the hold-down safety cover of the present invention with the baby-to-blanket attachment means in unattached of disengaged open extended relationship and with the blanket-to-mattress attachment means also in unattached or disengaged open extended relationship. Also, it should be noted that no baby is shown and the mattress to which the device is to be attached is also not shown in this view. This is done for reasons of drawing simplicity and clarity.

FIG. 2 is a bottom perspective view of FIG. 1, produced by laterally turning over and positionally reversing FIG. 1 and then viewing it from substantially the same vantage point as FIG. 1.

FIG. 3 is another upper perspective view similar in some respects to FIG. 1 and this time shows both the baby-to-blanket attachment means and the blanket-to-mattress attachment means in effectively attached or engaged relationship, in the first case with respect to a baby (shown in phantom) and in the second case with respect to a mattress (also shown in phantom). In other words, this view shows the device in fully operative relationship.

FIG. 4 is a bottom perspective view of FIG. 3, produced by laterally turning over and positionally reversing FIG. 3 and then viewing it from substantially the same vantage point as FIG. 3.

FIG. 5 is a fragmentary view illustrating the partial detachment or disengagement of a portion of the baby-to-blanket attachment means to allow the baby to be either placed under the blanket and subsequently fastened in place, or to allow the baby to be removed from such a previously fastened position under the blanket.

FIG. 6 is a fragmentary view of a top portion of the device of FIGS. 3 and 4, illustrating a slightly modified mode of use of the pair of shoulder-engageable yoke strap members which makes them effectively cooperable with the shoulders of a smaller child than when fastened in the manner shown in FIGS. 3 and 4.

Figure 1:
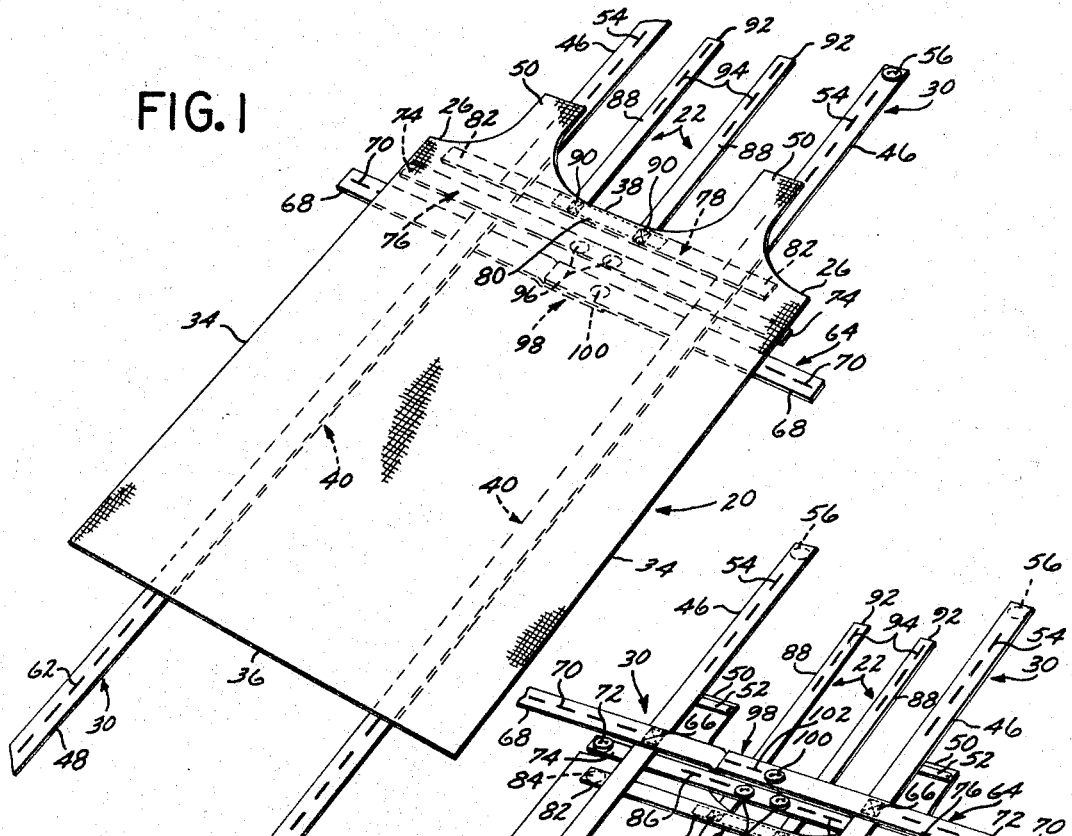

Generally speaking, the novel hold-down safety cover of the present invention may be said to comprise a flexible thin-sheet blanket, such as is generally indicated at 20, which may be of flexible thin-sheet material, usually fabric material or the like, although not specifically so limited in all forms of the invention, and which usually may be said to be of substantially rectangular configuration as seen in top plan view, although this is to be very broadly construed and is not to be taken as specifically limiting said blanket 20 to an exact rectangular configuration as seen in top plan view.

The blanket 20 is effectively provided with baby-to-blanket attachment means, such as is generally designated by the reference numeral 22, which is of a controllably engageable and disengageable and controllably size-adjustable type adapted for controllably size-adjustably connecting and attaching a baby's body or torso, such as that shown in phantom at 24 in FIGS. 3 and 4, with respect to what might be termed a head edge portion 26 of the blanket, generally designated at 20, and doing so in a manner such as to be incapable of disengagement by the baby, such as shown in phantom and generally designated at 28.

The blanket 20 is also provided with controllably engageable and disengageable and controllably size-adjustable blanket-to-mattress attachment means, such as is generally designated at 30, which is adapted for controllably size-adjustably connecting and attaching peripheral portions of the blanket 20 with respect to a mattress, such as is shown in phantom at 32 in FIGS. 3 and 4, in a manner such that said blanket-to-mattress attachment means 30 is incapable of being disengaged from the mattress 32 by the baby 28.

In the exemplary form of the invention illustrated, the blanket 20 has a pair of laterally spaced, substantially parallel, longitudinally directed side edge portions 34 and a pair of longitudinally spaced, substantially parallel, laterally directed edge portions substantially perpendicular to said side edge portions 34 and comprising the previously mentioned head edge portion 26 and a foot edge portion 36.

In the exemplary form illustrated, said head edge portion 26 has an intermediate edge part cut away at a location substantially centrally positioned between said side edge portions 34 to provide an indentation 38 through which the head, neck, and, in certain cases, the upper torso portion of the baby 28 may extend when the baby is positioned and fastened under the blanket 20 in the manner shown in FIGS. 3 and 4. In the exemplary form illustrated, the above-mentioned indentation 38 is greater in width than it is in depth in a direction extending from said head edge portion 26 toward said foot edge portion 36. However, this may be modified within the broad scope of the present invention.

In the exemplary form of the invention illustrated, the previously generically referred-to blanket-to-mattress attachment means, generally designated at 30, takes a specific form including the various elements described hereinbelow wherein it may be said to comprise a mattress-engageable hold-down harness means, also designated by said reference numeral 30, adapted to engage side, end, and bottom portions of the mattress 32.

Figure 2:
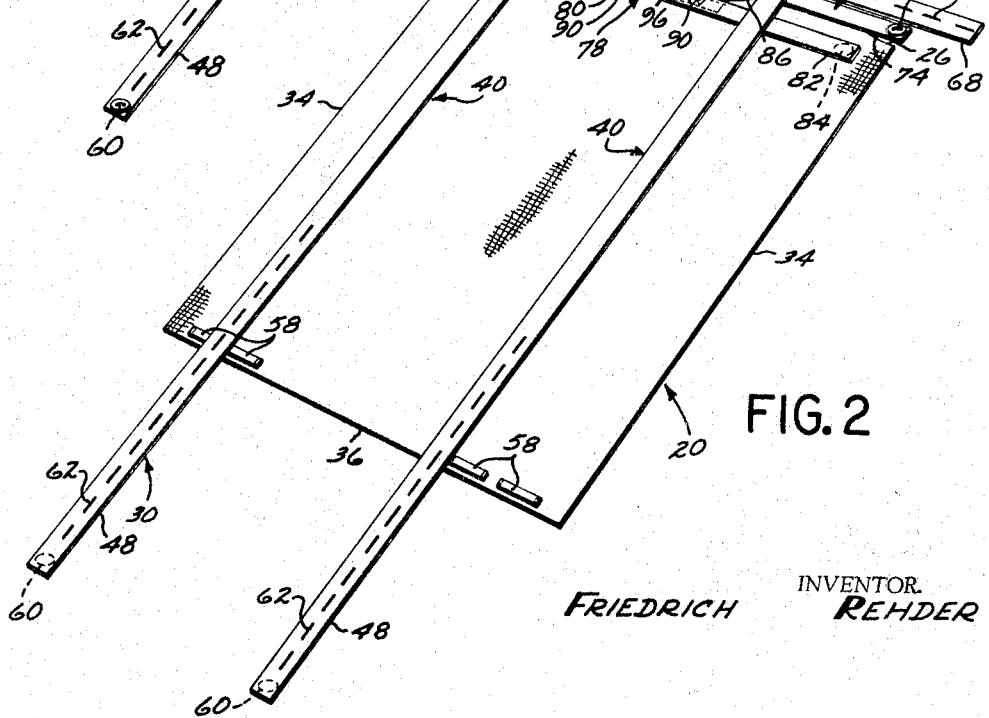

In the form illustrated, said harness means 30 includes a pair of laterally spaced, longitudinally directed strap members 40 adapted to underlie corresponding bottom surface portions of the mattress 32 from a head end 42 to a foot end 44 thereof and having corresponding extended head end connection portions 46 and extended foot end connection portions 48 adapted to extend substantially beyond the corresponding head and foot ends 42 and 44 of the mattress 32 and also substantially beyond corresponding head end and foot end portions 26 and 36 of the blanket 20 when said blanket-to-mattress attachment means, generally designated at 30, is in the unattached or disengaged, open or extended relationship shown in FIGS. 1 and 2.

It will be noted that said blanket 20, at locations on each side of said central or intermediate indentation 38, is effectively provided with what might be termed extended side attachment portions 50, each of which is provided with underlying fastening loop means 52 adapted to receive therethrough the corresponding extended head end connection portions 46 of said pair of longitudinal strap members 40 which are then adapted to be folded back into looped, effectively length-adjustable relationship relative to said fastening loop means 52 and fastened in the selected length-adjusted relationship thereof by the adjustable fastening means comprising the plurality of buttonhole means 54 spaced along the length of said extended head end connection portions 46 and the cooperating button 56 carried at the end of each of said head end connection portions 46.

Said foot edge portion 36 of the blanket 20 is provided with at least one pair (in the example illustrated, two pairs) of laterally spaced fastening loop members 58 similar in construction to the previously described fastening loop members 52 and each adapted to similarly receive therethrough the corresponding one of said pair of extended foot end connection portions 48 in a manner similar to the above-described engagement of said head end connection portions 46 in the corresponding fastening loop members 52. In other words, said foot end connection portions 48 are folded back into an effective over-all length-adjustable loop, and the button 60 at the end thereof is engaged with any one of the plurality of buttonholes 62 along each of said extended foot end connection portions 48 in a manner similar to that described above in connection with the head end connection portions 46.

It will be understood that the above-described portions of the harness means, generally designated at 30, make it possible to firmly and positively fasten the head edge portion 26 and the foot edge portion 36 of the blanket 20 with respect to corresponding head and foot ends 42 and 44 of the mattress 32, irrespective of the over-all length of the mattress 32.

The harness means, generally designated at 30, is also provided with a laterally directed strap member 64 firmly fastened, such as by rivet means, sewing means, or the like, to the two longitudinal strap members 40 at the two fastening locations designated at 66, with said laterally directed strap member 64 having a pair of laterally extended side connection portions 68 extending therefrom beyond the normal width of the mattress 32 and also beyond the normal width of the blanket 20 and with said laterally extended side connection portion 68 having a plurality of buttonhole means 70 spaced therealong for fastening attachment with respect to the corresponding button means 72 carried by the outer attachment ends 74 of a transverse strap member, generally designated at 76, and which comprises a part of the previously mentioned baby-to-blanket attachment means, generally designated at 22. In other words, the arrangement is such that the laterally directed strap member 64 of the blanket-to-mattress attachment means, generally designated at 30, is adapted to engage a corresponding bottom surface portion of the mattress 32 (which may be of virtually any desired width) and to have the laterally extended side connection portions 68 folded upwardly along side edges of the mattress 32 and then inwardly under the corresponding side edges 34 of the blanket 20 for attachment of the corresponding buttonhole means 70 and button means 72 whereby to positively lock the mattress 32, by way of said transverse strap 76 of the baby-to-blanket connection means 22, to the blanket 20 and in a laterally size-adjustable manner capable of such attachment with respect to a mattress 32 which may vary substantially in width.

The previously generically referred-to baby-to-blanket attachment means, generally designated at 22, includes, in addition to the transverse strap 76 referred to in the preceding paragraph, a centrally positioned and centrally fastened upper body-encircling strap member, generally designated at 78 which is fastened, such as by sewing or the like, at a central or intermediate location 80 along the portion of said head edge 26 of the blanket 20 lying immediately adjacent to and below the central part of the indentation 38, with said body-encircling strap member 78 having free outer end portions 82 provided with fastening button means 84 which normally controllably adjustably engage the previously mentioned transverse and rear-positioned strap member 76 by way of engagement with any selected one of the buttonhole means of the two transversely spaced sets of said buttonhole means 86. The arrangement is such that said body-encircling strap member 78 and the central or intermediate portion of said transverse strap 76 between the engaged buttons 84 and buttonhole means 86 provide complete encircling of the torso 24 of the baby 28 when the baby is fastened into the baby-to-blanket attachment means, generally designated at 22 in the manner clearly shown in FIGS. 3 and 4.

Also, said baby-to-blanket attachment means, generally designated at 22, includes a pair of shoulder-engageable yoke strap members, designated at 88, each having connection ends 90 firmly fastened, such as by sewing, riveting, or the like, to the inside surface of the edge of said blanket 22 immediately underlying and adjacent to the central part of said indentation 38. Said shoulder-engageable yoke strap members 88 have outer free ends 92 provided with a plurality of longitudinally spaced buttonhole means 94, any one of which is adapted to be fastened to the corresponding one of the button means 96 carried by said transverse strap member 76 at locations between the fastening of the outer free ends 82 of the body-encircling strap member 78 with respect to said transverse strap member 76. The arrangement just described is such that the pair of shoulder-engageable yoke strap members 88 pass over and engage the shoulders of the body 24 of the child 28 when said child is in fully engaged and fastened relationship with respect to the body-to-blanket attachment means, generally designated at 22, as is shown in FIGS. 3 and 4.

It will be noted that the detailed structure of the above-described baby-to-blanket attachment means, generally designated at 22, is such that the baby may be quickly and easily engaged and/or disengaged with respect thereto by merely unfastening one of the button means 96 from the corresponding buttonhole means 94 of one of the shoulder-engageable yoke strap members 88, which will allow the upper portion of the baby's body 24 to be shifted laterally so that the other shoulder-engageable yoke strap member 88 may be slidably moved off of the other shoulder of the baby, after which the baby's body 24 may be entirely slidably removed from within the body-encircling strap member 78 and, thus, entirely removed from underneath the blanket 20. On the other hand, it may be found easier to engage and disengage the baby with respect to the baby-to-blanket attachment means, generally designated at 22, by unfastening both of the button means 96 from the two corresponding buttonhole means 94 of the two corresponding shoulder-engageable yoke strap members 88. This arrangement is best shown in FIG. 5. The re-engagement operation is the reverse of that just described. In some cases, it may be found advantageous to also unfasten one of the free ends 82 of the body-encircling strap member 78 from its position underneath the corresponding one of the baby's arms, by disengaging the corresponding button 84 from the corresponding buttonhole means 86. However, this is not necessary in all cases.

It will be noted that, in every case where button means and a plurality of corresponding buttonhole means are employed for size-adjustment purposes, the relative positions (and/or number) of the button means and buttonhole means may be reversed within the broad scope of the present invention, since they, in a broad sense, may merely be said to comprise two-element fastener means with the button means comprising a first element and the buttonhole means comprising a second element, and since the positional arrangement of said first and second elements is unimportant. Also, in this connection, it should be noted that various other two-element fastening means may be employed in lieu of such button means and buttonhole means arrangements, and this is intended to be included and comprehended within the broad scope of the present invention. Additionally, it should be noted that, to further enhance the size-adjustment feature of the apparatus, the two shoulder-engageable yoke strap members 88 may be effectively crossed by merely reversing the relative position of the attachment ends 92 thereof as is clearly shown in FIG. 6. This, of course, provides effective shoulder-engaging cooperation with the shoulders of a child of substantially smaller size.

Also, in connection with providing maximum size adjustability, it should be noted that the previously mentioned laterally directed strap member 64 of the harness means, generally designated by the reference numeral 30, may be centrally provided with a two-element fastener means, such as is generally designated at 98, which may be of the button and buttonhole type previously described, wherein said strap member has overlapped connection ends at the center thereof, with one of said ends being provided with a button means 100 and with the other of said connection ends being provided with a plurality of buttonhole means 102, size-adjustably fastenable in a manner similar to that previously described in connection with various other fastening means of the buttonhole and button type.

It should be noted that all of the strap members of the invention are made of strong, tension-resisting fabric-type webbing material which is completely washable, and that the blanket 20 is also made of washable fabric material, although various other suitable materials may be employed in lieu of those just described. It should also be noted that, in a preferred form of the invention, the blanket side edges 34 are laterally extended sufficiently beyond the normal width of the mattress 32 to allow them to be folded downwardly and tucked inwardly under side edges of the mattress 32 in a manner such as to prevent the undesired entry of air laterally between said side edges 34 of the blanket 20 and the corresponding side edges of the mattress 32. In other words, this provides for more effectively sealingly enclosing the baby's body 24 to provide maximum warmth. However, this is not to be construed as limiting the invention, and, in certain forms, said side blanket edges 34 may not be provided with such excessive laterally extended overhanging portions for such folding-under purposes.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A hold-down safety cover for a baby adapted to be firmly but controllably removably fastened with respect to a mattress and adapted, when fastened with respect to a baby, to firmly hold the baby above the mattress and underneath the cover, comprising a flexible thin-sheet blanket of flexible thin-sheet material and of substantially rectangular configuration as seen in top plan view, said blanket having a pair of laterally spaced longitudinally directed side edge portions and a pair of longitudinally spaced laterally directed edge portions comprising a foot edge portion and a head edge portion, said head edge portion of said blanket being provided with controllably engageable and disengageable size-adjustable baby-to-blanket attachment means for controllably size-adjustably connecting and attaching a baby's torso with respect to said head edge portion of said blanket in a manner incapable of disengagement therefrom by the baby, said blanket being provided with controllably engageable and disengageable size-adjustable blanket-to-mattress attachment means for controllably size-adjustably connecting and attaching spaced peripheral portions of said blanket with respect to a mattress in a manner incapable of disengagement therefrom by the baby, said blanket-to-mattress attachment means comprising mattress-engageable hold-down harness means adapted to engage side, end, and bottom portions of a mattress for a baby bed, said harness means including a pair of laterally spaced, longitudinally directed strap members adapted to underlie corresponding bottom surface portions of said mattress from a head end thereof a foot end thereof and having extended head end connection portions and extended foot end connection portions, said blanket having side attachment portions at each side of said head edge portion of said blanket provided with fastening loop means adapted to receive said extended head end connection portions of said pair of longitudinally directed strap members of said harness means in looped and effectively length-adjustable relationship therethrough, said extended head end connection portions of said pair of longitudinal strap members each being provided therealong with a plurality of longitudinally spaced fastener means first elements and a cooperable fastener means second element at the end thereof for folded-back engagement of said second element with respect to any selected one of said first elements thereof, said foot edge portion of said blanket being provided with at least one pair of laterally spaced fastening loop means adapted to receive said extended foot end connection portions of said pair of longitudinal strap members of said harness means in looped and effectively length-adjustable relationship therethrough, said extended foot end connection portions of said pair of longitudinal strap members each being provided therealong with a plurality longitudinally spaced fastener means first elements and a cooperable fastener means second element at the end thereof for folded-back engagement of said second element with respect to any selected one of said first elements thereof.

2. A device as defined in claim 1, wherein said harness means also includes a laterally directed strap member interconnecting said pair of longitudinal strap members and having laterally extended side connection portions, each provided adjacent the outer end thereof with a plurality of longitudinally spaced fastener means first elements, and wherein said baby-to-blanket attachment means comprises an upper body-encircling strap member centrally positioned and centrally transversely fastened with respect to said head edge portion of said blanket and having free outer end portions each provided with a fastener means first element, a transverse rear strap member having outer attachment ends adapted to be firmly effectively attached with respect to said mattress and having an intermediate centrally positioned portion therebetween provided with a pair of transversely spaced sets of cooperable fastener means second elements for engaging said fastener means first elements carried by the corresponding free outer end portions of said upper body-encircling strap member, said outer attachment ends of said transverse strap member each having a cooperable fastener means second element engageable with any selected one of said plurality of fastener means first elements carried by corresponding outer ends of said side connection portions of said laterally directed strap member of said harness means for firm fastening attachment with respect thereto whereby to effectively fasten said transverse strap member firmly relative to said mattress, a pair of shoulder-engageable yoke strap members each having attachment ends fixedly attached to said upper edge portion of said blanket and each having a remote free end thereof having a plurality of longitudinally spaced fastener means first elements spaced therealong, said intermediate portion of said transverse rear strap member being provided with a pair of intermediate fastener means second elements adapted to be fastened to corresponding selected ones of said plurality of fastener means first elements carried by corresponding free ends of said pair of shoulder-engageable yoke strap members at locations between the fastening of said outer free ends of said body-encircling strap member with respect to said transverse strap member.

3. A hold-down safety cover for a baby adapted to be firmly but controllably removably fastened with respect to a mattress and adapted, when fastened with respect to a baby, to firmly hold the baby above the mattress and underneath the cover, comprising a flexible thin-sheet blanket of flexible thin-sheet material and of substantially rectangular configuration as seen in top plan view, said blanket having a pair of laterally spaced substantially parallel longitudinally directed side edge portions and a pair of longitudinally spaced substantially parallel laterally directed edge portions comprising a foot edge portion and a head edge portion, with said foot and head edge portions being substantially perpendicular to said side edge portions, said head edge portion having an intermediate edge part cut-away at a location substantially centrally positioned between said side edge portions to provide an indentation through which the head, neck, and upper torso portion of a baby may extend, said head edge portion of said blanket being provided with controllably engageable and disengageable size-adjustable baby-to-blanket attachment means for controllably size-adjustably connecting and attaching a baby's torso with respect to said head edge portion of said blanket in a manner incapable of disengagement therefrom by the baby, said blanket being provided with controllably engageable and disengageable size-adjustable blanket-to-mattress attachment means for controllably size-adjustably connecting and attaching spaced peripheral portions of said blanket with respect to a mattress in a manner incapable of disengagement therefrom by the baby, said blanket-to-mattress attachment means comprising mattress-engageable hold-down harness means adapted to engage side, end, and bottom portions of a mattress for a baby bed, said harness means including a pair of laterally spaced, longitudinally directed strap members adapted to underlie corresponding bottom surface portions of said mattress from a head end thereof to a foot end thereof and having extended head end connection portions and extended foot end connection portions, said blanket being provided with extended side attachment portions on each side of said intermediate cutaway indentation with said extended side portions being provided with underlying fastening loop means adapted to receive said extended head end connection portions of said pair of longitudinal strap members of said harness means in looped and effectively length-adjustable relationship therethrough, said extended head end connection portions of said pair of longitudinal strap members each being provided therealong with a plurality of longitudinally spaced fastener means first elements and a cooperable fastener means second element at the end thereof for folded-back engagement of said second element with respect to any selected one of said first elements thereof, said foot edge portion of said blanket being provided with at least one pair of laterally spaced fastening loop means adapted to receive said extended foot end connection portions of said pair of longitudinal strap members of said harness means in looped and effectively length-adjustable relationship therethrough, said extended foot end connection portions of said pair of longitudinal strap members each being provided therealong with a plurality of longitudinally spaced fastener means first elements and a cooperable fastener means second element at the end thereof for folded-back engagement of said second element with respect to any selected one of said first elements thereof.

4. Apparatus as defined in claim 3, wherein said harness means also includes a laterally directed strap member interconnecting said pair of longitudinal strap members and having laterally extended side connection portions, each provided adjacent the outer end thereof with a plurality of longitudinally spaced fastener means first elements, said baby-to-blanket attachment means comprising an upper body-encircling strap member centrally positioned and centrally transversely fastened with respect to said head edge portion of said blanket and having free outer end portions each provided with a fastener means first element, a transverse rear strap member having outer attachment ends adapted to be firmly effectively attached with respect to said mattress and having an intermediate centrally positioned portion therebetween provided with a pair of transversely spaced sets of cooperable fastener means, second elements for engaging said fastener means first elements carried by the corresponding free outer end portions of said upper body-encircling strap member, said outer attachment ends of said transverse strap member each having a cooperable fastener means second element engageable with any selected one of said plurality of fastener means first elements carried by corresponding outer ends of said side connection portions of said laterally directed strap member of said harness means for firm fastening attachment with respect thereto whereby to effectively fasten said transverse strap member firmly relative to said mattress, a pair of shoulder-engageable yoke strap members each having attachment ends fixedly attached to said upper edge portion of said blanket and each having a remote free end thereof having a plurality of longitudinally spaced fastener means first elements spaced therealong, said intermediate portion of said transverse rear strap member being provided with a pair of intermediate fastener means second elements adapted to be fastened to corresponding selected ones of said plurality of fastener means first elements carried by corresponding free ends of said pair of shoulder-engageable yoke strap members at locations between the fastening of said outer free ends of said body-encircling strap member with respect to said transverse strap member.

References Cited

UNITED STATES PATENTS

| | | | |
|---|---|---|---|
| 1,802,540 | 4/1931 | Schmidt | 5—336 X |
| 1,964,271 | 6/1934 | O'Dwyer | 2—336 X |
| 2,683,267 | 7/1954 | Weil | 5—336 X |

FOREIGN PATENTS

| | | |
|---|---|---|
| 857,712 | 1/1961 | Great Britain. |
| 126,770 | 7/1928 | Switzerland. |

DAVID J. WILLIAMOWSKY, *Primary Examiner.*

FRANK B. SHERRY, *Examiner.*

A. CALVERT, *Assistant Examiner.*